(12) United States Patent
Shawyer (10) Patent No.: US 7,681,906 B2
(45) Date of Patent: Mar. 23, 2010

(54) COLLAPSIBLE TRAILER

(76) Inventor: Robert Gordon Shawyer, 125 Gardiners Road, Maclean, New South Wales, 2463 (AU)

( * ) Notice: Subject to any disclaimer, the term of this patent is extended or adjusted under 35 U.S.C. 154(b) by 273 days.

(21) Appl. No.: 11/789,436

(22) Filed: Apr. 24, 2007

(65) Prior Publication Data
US 2007/0246911 A1 Oct. 25, 2007

(30) Foreign Application Priority Data
Apr. 24, 2006 (AU) ................. 2006100327

(51) Int. Cl.
*B62B 1/00* (2006.01)
*B60P 3/10* (2006.01)
(52) U.S. Cl. .................... 280/656; 280/414.1
(58) Field of Classification Search ............. 280/414.1, 280/414.2, 414.3, 47.331, 656, 638, 789, 280/852, 155, 415.1, 443, 124.116, 304.3, 280/651, 65, 124.179, 400
See application file for complete search history.

(56) References Cited

U.S. PATENT DOCUMENTS

| | | | | |
|---|---|---|---|---|
| 2,219,401 A * | 10/1940 | Sampsell | ............. | 414/529 |
| 2,374,383 A * | 4/1945 | Sampsell | ............. | 414/529 |
| 2,442,248 A * | 5/1948 | Sampsell | ............. | 414/536 |
| 2,497,072 A * | 2/1950 | Cooper | ............. | 280/124.13 |
| 2,525,506 A * | 10/1950 | Wiedman | ............. | 280/82 |
| 2,571,213 A * | 10/1951 | Cunningham et al. | ....... | 414/536 |
| 2,660,443 A * | 11/1953 | Miller | ............. | 280/65 |
| 2,691,534 A * | 10/1954 | Sampsell | ............. | 280/414.1 |
| 2,720,413 A * | 10/1955 | Halverson | ............. | 296/10 |
| 2,732,219 A * | 1/1956 | Miller | ............. | 280/788 |
| 2,789,835 A * | 4/1957 | Ashton | ............. | 280/414.1 |
| 2,933,328 A * | 4/1960 | Mcintyre et al. | ............. | 280/788 |
| 3,007,714 A * | 11/1961 | Olney | ............. | 280/414.1 |
| 3,308,975 A * | 3/1967 | Desfilles | ............. | 414/534 |
| 3,612,600 A * | 10/1971 | Salichs | ............. | 296/181.7 |
| 3,625,545 A * | 12/1971 | Somers et al. | ............. | 280/170 |
| 3,757,972 A * | 9/1973 | Martin | ............. | 414/537 |
| 3,945,521 A * | 3/1976 | Decker | ............. | 414/483 |
| 4,126,324 A * | 11/1978 | Browning | ............. | 280/42 |
| 4,807,894 A * | 2/1989 | Walker | ............. | 280/63 |
| 5,326,128 A * | 7/1994 | Cromley, Jr. | ............. | 280/656 |
| 5,387,001 A * | 2/1995 | Hull et al. | ............. | 280/402 |
| 5,464,243 A * | 11/1995 | Maiwald et al. | ............. | 280/638 |
| 5,692,779 A * | 12/1997 | Hedgepeth | ............. | 280/789 |
| 6,086,082 A * | 7/2000 | Andol | ............. | 280/414.1 |

(Continued)

FOREIGN PATENT DOCUMENTS

GB         2030933 A  *  4/1980

*Primary Examiner*—Glenn Dayoan
*Assistant Examiner*—Chiedu A Chibogu
(74) *Attorney, Agent, or Firm*—John L. Rogitz (57) ABSTRACT

A collapsible trailer has a trailer frame adapted to support a boat or marine vessel, the trailer frame including at least one longitudinal member and at least a pair of transverse members and at least two wheels, the wheels removably associated with opposed ends of a first of the pair of transverse members and marine vessel support means removably associated with the other of the pair of transverse members wherein the trailer frame is adapted to assume a use condition with the wheels attached for supporting a boat or marine vessel on the trailer and a collapsed condition with the wheels removed in which the trailer occupies less space than in the use condition.

24 Claims, 5 Drawing Sheets

U.S. PATENT DOCUMENTS

| | | |
|---|---|---|
| 6,428,035 B1 * | 8/2002 | Maxwell et al. .............. 280/656 |
| 6,540,245 B1 * | 4/2003 | Shankle et al. ........... 280/414.1 |
| 7,052,033 B2 * | 5/2006 | McDonell ................... 280/656 |
| 7,427,183 B2 * | 9/2008 | Stabeno ....................... 414/482 |
| 2004/0119262 A1 * | 6/2004 | Stout ....................... 280/415.1 |
| 2007/0045993 A1 * | 3/2007 | Jager .......................... 280/656 |

* cited by examiner

COLLAPSIBLE TRAILER

RELATED APPLICATION

This application claims priority to Australian patent application number 2006100327 filed on Apr. 24, 2006, incorporated herein by reference.

FIELD OF THE INVENTION

The present invention relates to collapsible trailers and in particular to collapsible boat trailers for use or carriage of boats or other marine vessels when they are removed from the water which can be folded and/or collapsed into a smaller configuration for storage.

BACKGROUND OF THE INVENTION

One of the problems of concern to small boat users or owners of smaller marine vessels such as jet skis or the like, is the parking of the automobile and trailer after the vessel is launched. This problem has become even more acute as the popularity of small boat ownership has increased and available parking space has not kept up with the demand. Further, there are many launching sites which do not even provide any parking facilities.

Some of the small boat users are forced to transport the small boat atop their automobile. This involves, of course, using some type of carry-all on top of the automobile to protect the finish of the automobile. The vast majority however, use trailers to transport their marine vessel.

Even where adequate facilities are provided for parking the automobile and the trailer, there are many occasions when, after the boat is launched, and the trailer is still attached to the car, the automobile has to be used. In that case, the driver of the automobile has to lug the long trailer around or disconnect the trailer and leave it at the launching site with all the bother and risk that entails.

Trailers for small boats, of course, must be stored during off-season. At that time, the boat may be stored on a rack in a garage, for example, and then it is important to be able to store the trailer in the smallest possible space.

As understood herein, foldable or collapsible boat trailers that have pivotally mounted wheels associated with them result in a larger than necessary space being used when the trailer is folded or collapsed. This may particularly be the case when the wheels are each associated with a wheel protecting flap or "mud guard" which must be spaced from the wheel to allow the wheel to properly rotate.

Accordingly, as understood herein there is a need for a collapsible boat trailer allowing both the carriage of a boat or other marine vessel and still allowing folding or collapsing into a substantially smaller configuration for storage by removing the wheels.

SUMMARY OF THE INVENTION

The present invention is directed to a collapsible boat trailer which may at least partially overcome the above-mentioned disadvantages or provide the consumer with a useful or commercial choice.

In one form, the invention resides in a collapsible trailer comprising a trailer frame adapted to support a boat or marine vessel, the trailer frame including at least one longitudinal member and at least a pair of transverse members and at least two wheels, the wheels removably associated with opposed ends of a first of the pair of transverse members and marine vessel support means removably associated with the other of the pair of transverse members wherein the trailer frame is adapted to assume a use condition with the wheels attached for supporting a boat or marine vessel on the trailer and a collapsed condition with the wheels removed in which the trailer occupies less space than in the use condition.

Typically, each of the pair of transverse members may be rotatably mounted to the longitudinal member and extend to either side of the longitudinal member. Preferably, one transverse member may be mounted above the longitudinal member and the other of the pair mounted below the longitudinal member. Each transverse member will typically be mounted approximately centrally to the longitudinal member having an approximately equal length on either side of the longitudinal member.

Preferably, when adapting the trailer into the collapsed condition, the pair of transverse members may be moved to be substantially parallel to the at least one longitudinal member. Suitably the transverse members may be rotatably mounted relative to the at least one longitudinal member. Collapsing the trailer may then be accomplished by rotating the transverse members to be substantially parallel to the at least one longitudinal member.

There may suitably be one or more bracing members associated with either of the transverse members in order to assist in maintaining the transverse members in the use position. In particular, at least one bracing member may be removably attachable in relation to the transverse member associated with the wheels and the at least one longitudinal member. Preferably, each bracing member may have a first end attached relative to the longitudinal member and a second end attached relative to the transverse member. Typically, the bracing members may be attached one on either side of the longitudinal member and may be attached either in front of the transverse member or behind them. The bracing members may be manufactured from a strong rigid material such as metal, particularly steel.

The at least one longitudinal member and each of the transverse members may preferably comprise more than one member which are positioned relative to one another when the trailer is converted to the used position. The members forming the respective longitudinal and transverse members may be configured depending upon the dimensions of the vessel to be supported thereon. The members forming the longitudinal and/or transverse members may be telescopically associated with one another to form the respective transverse or longitudinal members. Alternatively, the individual members may be at least partially insertable into or over one another to from the respective transverse or longitudinal members and be adapted to be maintained in this position relative to one another.

The longitudinal member may suitably have a ball and socket hitch means for hitching said trailer to the rear of a towing vehicle positioned substantially toward one end of the longitudinal member.

Preferably, there will be a main longitudinal member to which the pair of transverse members are mounted and two other longitudinal members one located forwardly of the main longitudinal member and one aft of the main longitudinal member. It is also preferred that the main longitudinal member is no longer than the transverse members and it is particularly preferred that the main longitudinal member, when in the collapsed condition, extends between the pair of transverse members between outer ends of the transverse members.

According to a first preferred embodiment, the collapsible boat trailer comprises a longitudinal member, an upper transverse member and a lower transverse member. The longitudinal member is the main support rail for the trailer. The upper transverse member preferably mounts the marine vessel rests and the lower transverse member is or houses the axle for the wheels. All members are substantially hollow metal members manufactured from box section.

The longitudinal member is formed from more than one piece which are secured relative to one another to form the longitudinal member.

The longitudinal member has a ball and socket hitch means for hitching said trailer to the rear of a towing vehicle positioned substantially toward one end of the longitudinal member. It also has at least one runner guide member mounted thereto to support and/or guide the keel of the marine vessel that it carries. The longitudinal member may also be provided with winch means to assist in drawing the vessel onto the trailer.

Both transverse members are rotatably associated with the longitudinal member. The lower transverse member includes a central portion pivotally associated with the longitudinal member and a pair of arm members which are pivotally attached about a substantially horizontal axis to the central portion. This allows the arm members of the lower transverse member to move about the central portion to provide a suspension action.

The trailer in this form has two wheels, one located at either end of the lower transverse member. The wheels are associated with stub axles which are insertable into the ends of the lower transverse member. Each stub axle and the lower transverse member are provided with a hole or slot through which a pin can be passed to releasably attach the stub axles to the lower transverse member.

The upper transverse member is associated with a wheel cover means or mud guard at each lateral end thereof. Each mud guard preferably has a stub axle which is insertable into the respective end of the upper transverse member. Each stub axle and the upper transverse member are provided with a hole or slot through which a pin can be passed to releasably attach the stub axles to the upper transverse member. The upper transverse member also mounts lateral vessel rests and guide means which both extend upwardly usually from the upper transverse member. The vessel rests are spaced outwardly from the longitudinal member along the upper transverse member.

Bracing rods are provided extending forwardly at an angle from the transverse members to the longitudinal member to maintain the position of the transverse members when in the use condition. Typically, only the lower transverse member is provided with bracing rods, one on either lateral side of the longitudinal member.

When adapting the trailer from the use condition to the collapsed condition, the pins holding the stub axles in position in the transverse members are removed allowing the wheels and the mud guards to be removed. The bracing rods are then removed and the transverse members may be moved to be substantially parallel to the longitudinal member. The longitudinal member is collapsed into its individual pieces and the trailer may then be substantially smaller than when in its use condition. Reversing the process assembles the trailer.

The upper transverse member is separated from the lower transverse member and the separation is typically may be maintained by spacing means. The spacing means may suitably be stays or gas stays. The stays may be a form of ram or compression spring which may be compressed when a force or load is applied but which return to their extended position when the force or load is removed. It is particularly preferred that the spacing means used is a compression spring and that the spring is located between the laterally outer ends of the transverse members.

The vessel rests or guide means including the lateral guide means may be attached relative to the respective members or directly attached thereto. The means of attachment may be using pins and slots or may be clamp means. Any means of attachment appropriate for the application is envisaged.

All portions and members of the trailer may suitably be removably attached to one another. There is suitably no component permanently attached to other components. The attachment means may suitably be pins and slots or bolts for example. All attachment means may suitably be operable by hand or with simple tools and heavy or specialized tools may not be required for assembly of the trailer or conversion between the use and the collapsed condition.

BRIEF DESCRIPTION OF THE DRAWINGS

Various embodiments of the invention will be described with reference to the following drawings, in which.

DETAILED DESCRIPTION OF THE PREFERRED EMBODIMENT

According to the invention, a collapsible trailer 10 is provided.

According to the preferred embodiment illustrated in the Figures, the collapsible trailer 10 includes a trailer frame adapted to support a boat or marine vessel, the trailer frame including a multipart longitudinal member 11 and a pair of transverse members 12, 13. The trailer also has two wheels 14, the wheels 14 removably associated with opposed ends of a first transverse member 12 and marine vessel support members 15 removably associated with the other transverse member 13.

Figure 2:
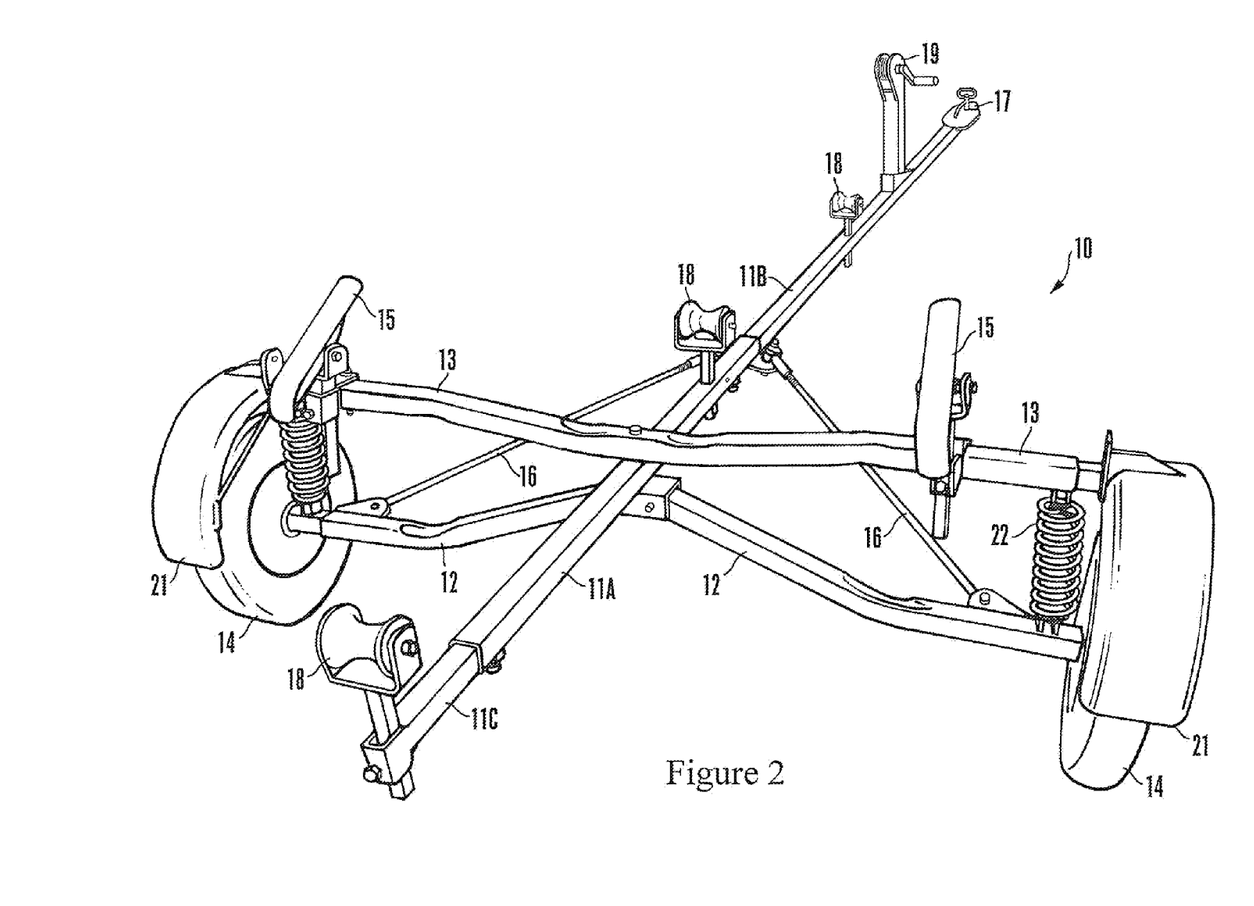
FIG. 2 is a reverse view of the trailer illustrated in FIG. 1.

Typically, each of the transverse members 12, 13 are rotatably mounted to the longitudinal member 11 and extend to either side of the longitudinal member 11. The second transverse member 13 is mounted above the longitudinal member 11 and the first transverse member 12 is mounted below the longitudinal member 11. Each transverse member 12, 13 is mounted approximately centrally to the longitudinal member 11 having an approximately equal length on either side of the longitudinal member 11. As shown in FIG. 2, while the transverse members 12, 13 are elongated, each end segment is straight but the middle portion of the transverse member is not completely straight, but rather assumes a somewhat flattened "V"- or "U"-shape, with the lower transverse member midsection extending above its straight end segments and with the upper transverse member midsection extending below its straight end segments, toward the midsection of the lower transverse member.

When adapting the trailer 10 into the collapsed condition, the pair of transverse members 12, 13 are rotated to be substantially parallel to the longitudinal member 11.

There are a pair of bracing rods 16 associated with the first transverse member 12 in order to assist in maintaining the transverse member in the use position. In particular, the bracing rods 16 are removably attachable in relation to the transverse member 12 associated with the wheels 14 and the longitudinal member 11. The bracing rods 16 are attached one on either side of the longitudinal member 11.

The longitudinal member 11 and each of the transverse members 12, 13 comprise more than one member which are telescopically associated with one another when the trailer 10 is converted to the used position. Alternatively, the individual members may be at least partially insertable into or over one another to from the respective transverse or longitudinal members and be adapted to be maintained in this position relative to one another.

Figure 5:
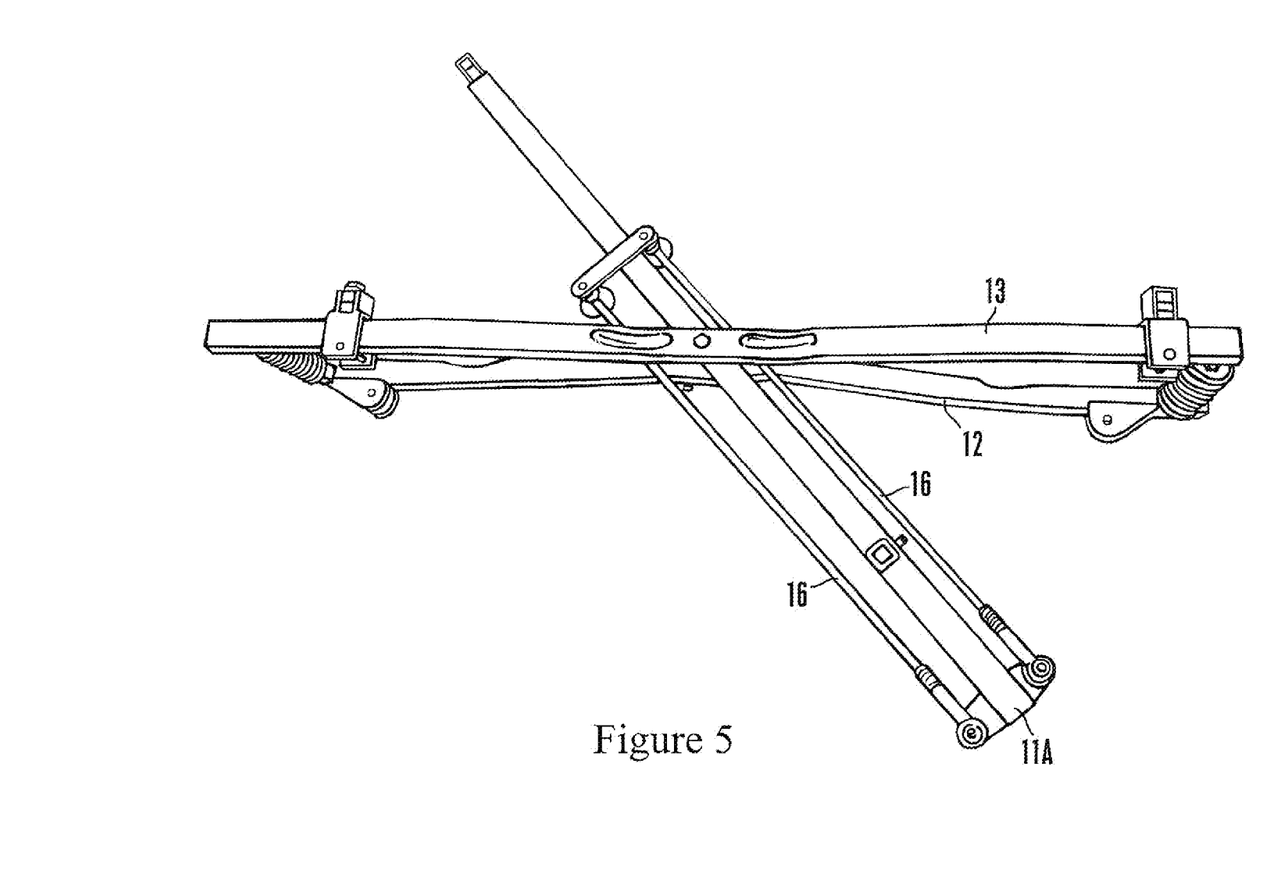
FIG. 5 is a top view of the main longitudinal member in a partially rotated or collapsed position.

According to the preferred embodiment illustrated, there is a main longitudinal member 11A to which the pair of transverse members 12, 13 are mounted and two other longitudinal members 11B, 11C, one located forwardly of the main longitudinal member 11A and one aft of the main longitudinal member 11A. As illustrated particularly well in FIG. 5, the main longitudinal member 11A is no longer than the transverse members 12, 13 and when in the collapsed condition, extends between the pair of transverse members 12, 13 between outer ends of the transverse members.

The longitudinal member 11 has a ball and socket hitch means 17 for hitching said trailer 10 to the rear of a towing vehicle positioned substantially toward one end of the longitudinal member 11.

The upper transverse member 13 mounts the marine vessel rests 15 and the lower transverse member 12 is or houses the axle for the wheels 14. All members are substantially hollow metal members manufactured from box section.

The longitudinal member also has runner guide members 18 mounted thereto to support and/or guide the keel of the marine vessel that it carries. The longitudinal member 11 is further provided with winch assembly 19 to assist in drawing the vessel onto the trailer 10.

The trailer 10 in this form has two wheels 14, one located at either end of the lower transverse member 12. The wheels 14 are associated with stub axles 20 which are insertable into the ends of the lower transverse member 12. Each stub axle 20 and the lower transverse member 12 are provided with a hole or slot through which a pin can be passed to releasably attach the stub axles 20 to the lower transverse member 12.

The upper transverse member 13 is associated with mud guards 21 at each lateral end thereof. Each mud guard 21 has a stub axle 20 which is insertable into the respective end of the upper transverse member 13. Each stub axle 20 and the upper transverse member 13 are provided with a hole or slot through which a pin can be passed to releasably attach the stub axles to the upper transverse member. The upper transverse member 13 also mounts vessel rests and guide means 15 which both extend upwardly from the upper transverse member 13. The vessel rests 15 are spaced outwardly from the longitudinal member 11 along the upper transverse member 13.

Bracing rods 16 are provided extending forwardly at an angle from the lower transverse member 12 to the longitudinal member 11 to maintain the position of the transverse member when in the use condition.

When adapting the trailer from the use condition to the collapsed condition, the pins holding the stub axles in position in the transverse members are removed allowing the wheels and the mud guards to be removed. The bracing rods are then removed and the transverse members may be moved to be substantially parallel to the longitudinal member. The longitudinal member is collapsed into its individual pieces and the trailer may then be substantially smaller than when in its use condition. Reversing the process assembles the trailer.

The upper transverse member 13 is separated from the lower transverse member 12 by spacing means. In the preferred embodiment illustrated, the spacing means are compression springs 22 which are compressed when a force or load is applied but which return to their extended position when the force or load is removed. It is particularly preferred that the springs are located between the lateral outer ends of the transverse members 12, 13.

Figure 1:
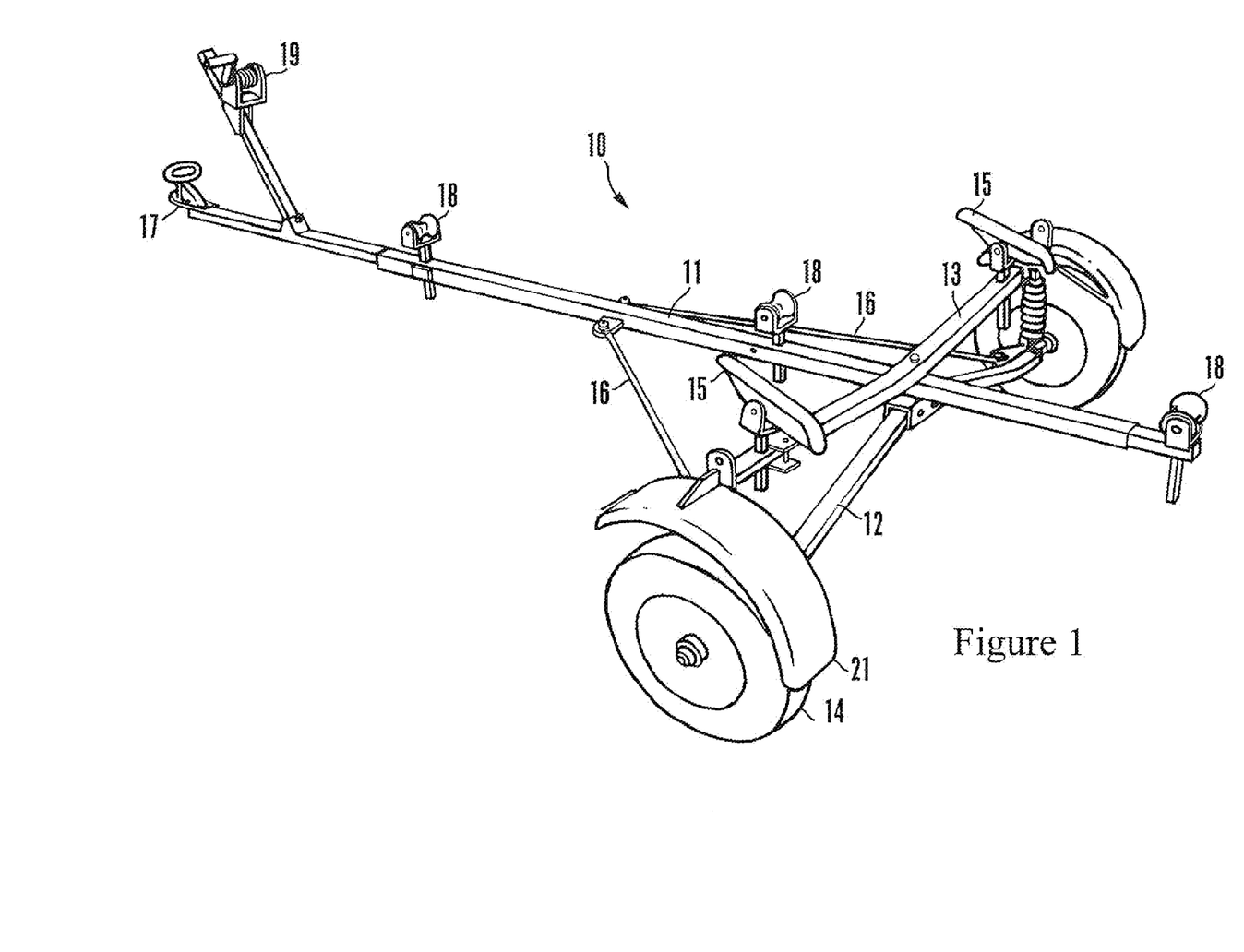
FIG. 1 is a perspective view of a collapsible trailer according to a first embodiment of the invention, in the use condition.
Figure 3:
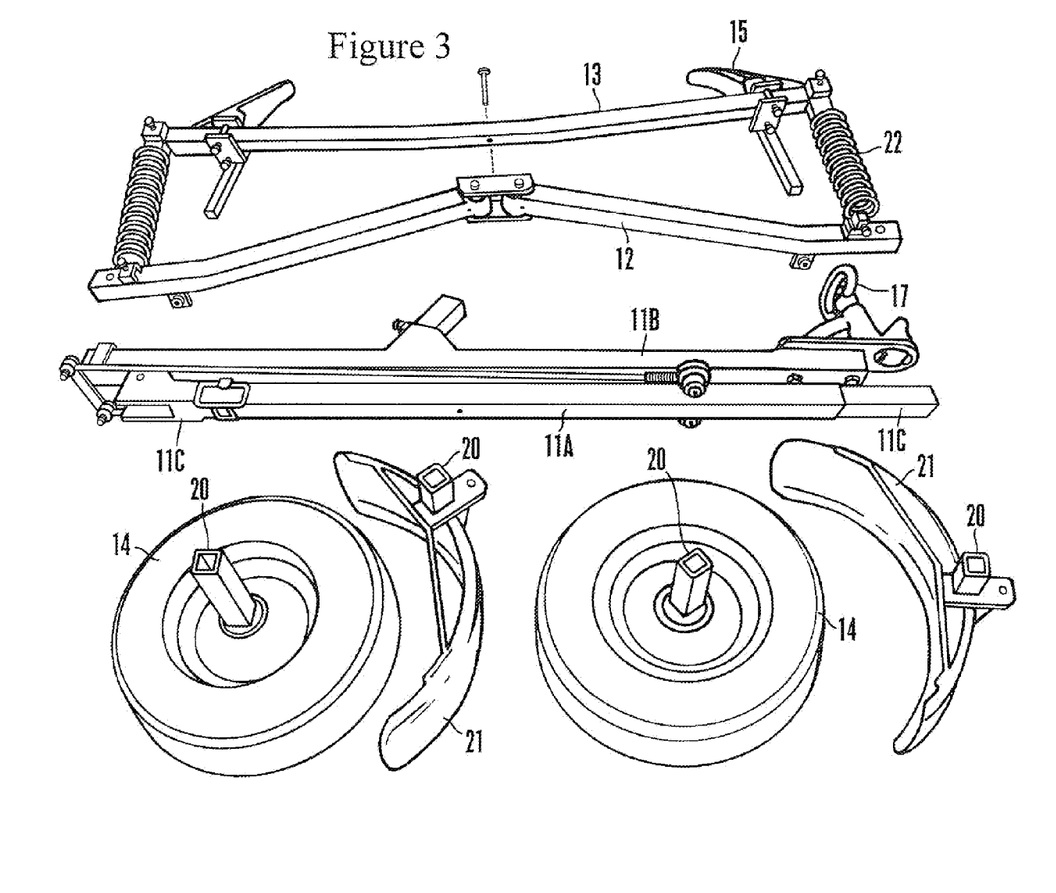
FIG. 3 is a top view of the collapsible trailer illustrated in FIG. 1 in the collapsed condition.
Figure 4:
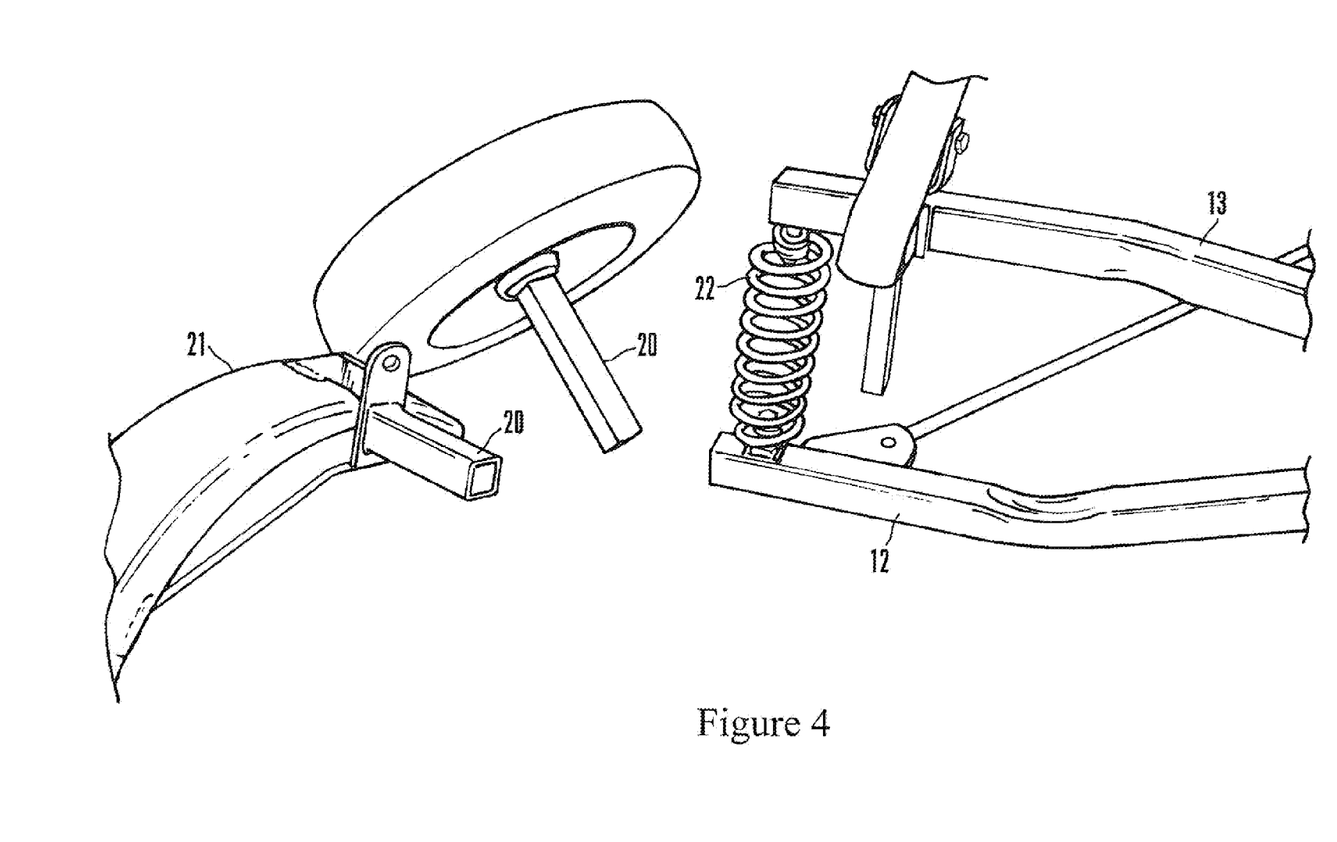
FIG. 4 is a detailed view of the outer ends of the pair of transverse members with the wheel and mud guard removed prior to collapsing.

All portions and members of the trailer may suitably be removably attached to one another such that the trailer can be manipulated between a use condition, as illustrated in FIG. 1 and a collapsed condition as illustrated in FIG. 3. There is suitably no component permanently attached to other components. The attachment means may suitably be pins and slots or bolts for example. All attachment means may suitably be operable by hand or with simple tools and heavy or specialized tools may not be required for assembly of the trailer or conversion between the use and the collapsed condition.

In the present specification and claims, the word "comprising" and its derivatives including "comprises" and "comprise" include each of the stated integers but does not exclude the inclusion of one or more further integers.

While the particular COLLAPSIBLE TRAILER is herein shown and described in detail, it is to be understood that the subject matter which is encompassed by the present invention is limited only by the claims.

What is claimed is:

1. A collapsible trailer comprising a trailer frame adapted to support a boat or marine vessel, the trailer frame including:
   at least two longitudinal members, one of the longitudinal members being a main longitudinal member;
   at least a pair of transverse members rotatably coupled to the main longitudinal member for movement relative to the main longitudinal member in a substantially horizontal plane;
   at least two wheels, the wheels removably associated with opposed ends of a first of the pair of transverse members; and
   marine vessel support means removably associated with the other of the pair of transverse members, wherein
   the trailer frame is adapted to assume a use condition with the wheels attached and the transverse members being substantially perpendicular to the main longitudinal member for supporting a boat or marine vessel on the trailer and a collapsed condition with the wheels removed and the main longitudinal member being substantially coplanar with the pair of transverse members in which the trailer occupies less space than in the use condition.

2. A collapsible trailer according to claim 1 wherein each of the pair of transverse members is rotatably mounted to the main longitudinal member and extends to either side of the longitudinal member.

3. A collapsible trailer according to claim 1 wherein one transverse member is mounted above the main longitudinal member and the other of the pair of transverse members is mounted below the main longitudinal member.

4. A collapsible trailer according to claim 1 wherein each transverse member is mounted approximately centrally to the main longitudinal member having an approximately equal length on either side of the main longitudinal member.

5. A collapsible trailer according to claim 1 further including one or more bracing members associated with either of the transverse members in order to assist in maintaining the transverse members in the use position.

6. A collapsible trailer according to claim 5 wherein at least one bracing member is removably attachable to at least one of the transverse members and at least one longitudinal member.

7. A collapsible trailer according to claim 5 wherein each bracing member has a first end attached relative to at least one longitudinal member and a second end attached relative to at least one of the transverse members.

8. A collapsible trailer according to claim 1 wherein a pair of bracing members are provided, one attached on either side of the main longitudinal member.

9. A collapsible trailer according to claim 1 wherein the at least two longitudinal members are positioned relative to one another when the trailer is converted to the used position.

10. A collapsible trailer according to claim 1 wherein the main longitudinal member is provided to which the pair of transverse members are mounted, and two other longitudinal members are provided, one located forwardly of the main longitudinal member and one aft of the main longitudinal member.

11. A collapsible trailer according to claim 9 wherein the main longitudinal member is no longer than the transverse members.

12. A collapsible trailer as claimed in claim 1 wherein an upper and a lower transverse member are provided, the wheels located one at either end of the lower transverse member, and wheel cover means provided, one located at either end of the upper transverse member.

13. The collapsible boat trailer according to claim 1 wherein the main longitudinal member is no longer than the transverse members.

14. The collapsible boat trailer according to claim 11 wherein the upper transverse member mounts at least one marine vessel rest wherein the lower transverse member is the axle for the wheels or houses the axle for the wheels.

15. The collapsible boat trailer according to claim 1 wherein the at least one longitudinal member has at least one runner guide member mounted thereto to support and/or guide a keel of the marine vessel that it carries.

16. The collapsible boat trailer according to claim 15 wherein one of the at least two longitudinal members is provided with winch means to assist in drawing the vessel onto the trailer.

17. The collapsible boat trailer according to claim 11 wherein the lower transverse member includes a central portion pivotally associated with the main longitudinal member and a pair of arm members which are pivotally attached about a substantially horizontal axis to the central portion.

18. The collapsible boat trailer according to claim 11 wherein the trailer has two wheels, one located at either end of the lower transverse member, and the wheels are associated with stub axles which are insertable into the ends of the lower transverse member.

19. The collapsible boat trailer according to claim 11 wherein the upper transverse member is associated with a wheel cover means or mud guard at each lateral end thereof.

20. The collapsible boat trailer according to claim 19 wherein each mud guard has a stub axle which is insertable into the respective end of the upper transverse member.

21. The collapsible boat trailer according to claim 19 wherein the upper transverse member also mounts lateral vessel rests and guide means which both extend upwardly usually from the upper transverse member.

22. The collapsible boat trailer according to claim 11 wherein the upper transverse member is separated from the lower transverse member and the separation is maintained by resilient spacing means.

23. The collapsible boat trailer according to claim 22 wherein the resilient spacing means is chosen from the group including a stay, a gas stay, or a ram.

24. The collapsible boat trailer according to claim 22 wherein the resilient spacing means is a compression spring which is compressed when a force or load is applied but which returns to its extended position when the force or load is removed.

* * * * *